A. B. DAVIS.
BALANCE SCALES.
No. 31,533.          Patented Feb. 26, 1861.
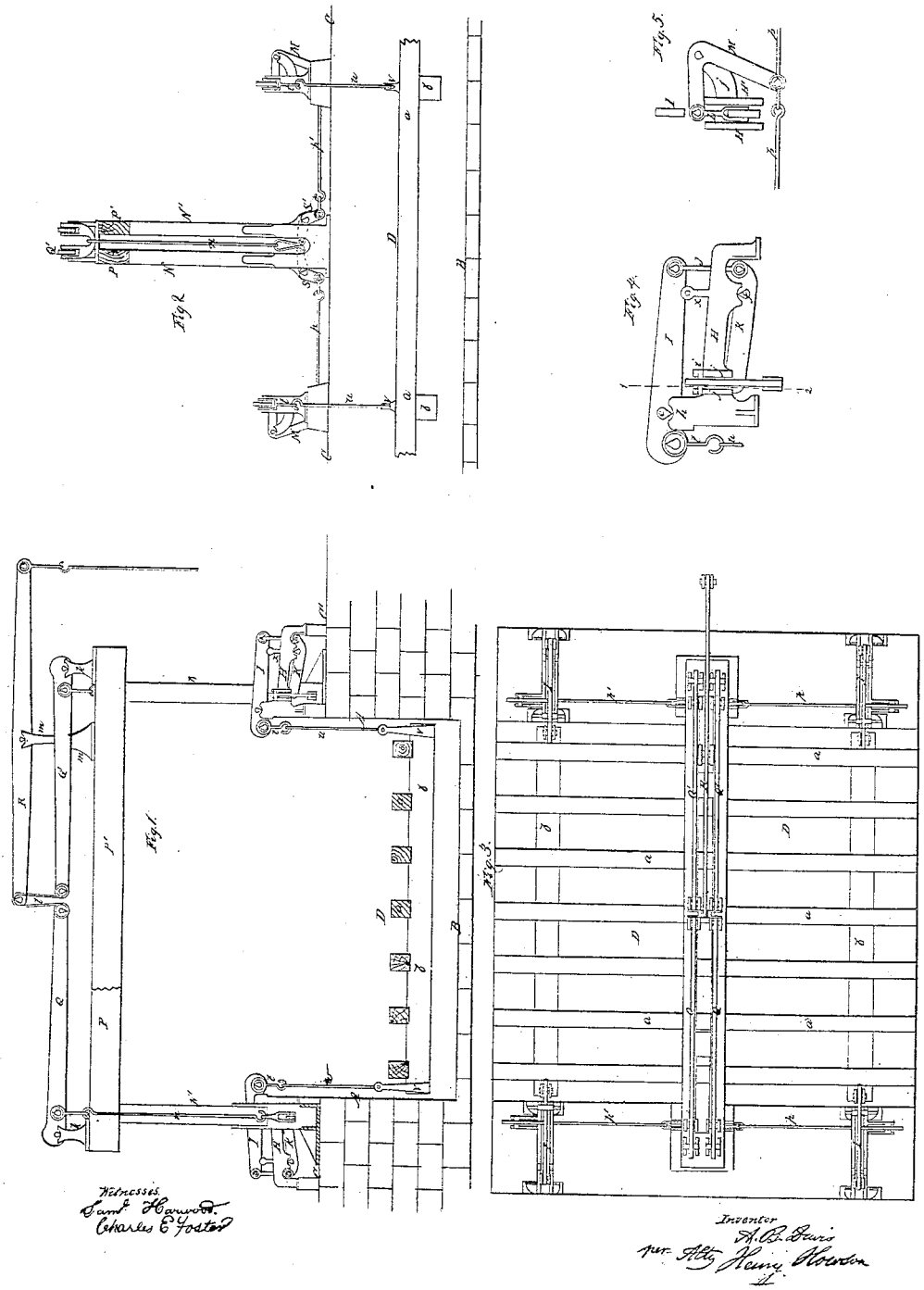

UNITED STATES PATENT OFFICE.

AUGUSTUS B. DAVIS, OF PHILADELPHIA, PENNSYLVANIA.

WEIGHING APPARATUS.

Specification of Letters Patent No. 31,533, dated February 26, 1861.

*To all whom it may concern:*

Be it known that I, AUGUSTUS B. DAVIS, of the city of Philadelphia and State of Pennsylvania, have invented certain new and useful Improvements in Weighing Apparatus; and I do hereby declare the following to be a full, clear, and exact description of the same, reference being had to the accompanying drawing and to the letters of reference marked thereon.

My invention relates to improvements in weighing apparatus used in connection with canal locks and my improvement consists, of a series of weighing frames each having three levers connected together and operating substantially as described hereafter, the said frames being arranged along the opposite walls of the lock in such a position that their main levers shall be at right angles to and shall partly overhang the said walls.

The object of my improvements has been to produce a simple and effective weighing apparatus which can be readily applied to a canal lock without disturbing the walls of the same.

In order to enable others skilled in the art to make and use my invention, I will now proceed to describe its construction and operation.

On reference to the accompanying drawing which forms a part of this specification, Figure 1, is a transverse section of my improved weighing apparatus as applied to the lock of a canal; Fig. 2, a longitudinal section of Fig. 1; Fig. 3, a ground plan; Fig. 4, an enlarged side view of one of the weighing frames, and Fig. 5, a transverse section of Fig. 4 on the line 1, 2.

Similar letters refer to similar parts throughout the several views.

A and A' are the opposite sides, and B the bottom of a canal lock, C representing the ground line on one side, and C' the ground line on the opposite side.

D is the submerged platform or cradle composed of a series of longitudinal beams $a$, $a$, secured to the transverse beams $b$, $b$.

On each side of the lock are secured a series of weighing frames represented in the enlarged views, Figs. 5 and 6, which I will now proceed to describe.

H and H' are two plates permanently secured to the masonry on the edge of the lock. In recesses in the elevated portions $h$ of these plates, rest the sharp edged projections $e$, which form the fulcrum of the lever I. The end of the long arm of this lever is connected by a double clevis J, to the end of the short arm of the lever K, the fulcrum of which is formed by two sharp edged projections $f$ bearing in a recess formed on the undersides of the plates H and H'. The end of the long arm of the lever K, is connected by the double clevis L, to the end of the short arm of the bell-crank lever M, the fulcrum of which is formed by two sharp edged projections $i$, $i$, resting in recesses on the end of the arms $j$, $j$, which project from the stationary plate H. The lower end of the long arm of this bell-crank lever is furnished with two sharp edged projections for receiving a clevis, which is connected by rods to the bell-crank lever of the adjacent weighing frame.

Midway between the opposite ends of the platform D, and on each side of the lock are erected two posts N and N', the posts on the opposite sides of the lock being connected together by the transverse beams P and P'.

Q and Q' are two pairs of levers, the fulcrums of one pair resting on a frame $k$ on one end of the transverse beams P and P', and the fulcrums of the other pair resting on a similar frame $k$ on the opposite ends of the same transverse beams. The ends of the long arms of these levers are connected by a double clevis $l$ to one arm of the lever R, the fulcrum of which is on a frame $m$ secured to the transverse beams, the end of the other arm of this lever being connected directly or indirectly to the graduated beam of the scale. The levers Q are connected by a rod $n$ (passing between the posts N and N') to the arms of the two bell-crank levers S and S', which have their fulcrums in projections on the said posts one lever being connected by a rod $p$, to the bell-crank lever M of one weighing frame, and the other by a rod $p'$, to the bell crank lever M of another weighing frame. The levers Q' are connected by similar appliances to the weighing frames situated on the opposite side of the lock.

The number of weighing frames used will depend upon the length of the platform or cradle D, the frames under ordinary circumstances being placed about fifteen feet apart from each other.

The short arm of the lever I of each weighing frame is connected to one of the transverse beams $b$ of the cradle by a clevis $t$, rod $u$, and strap $v$, so that the cradle and the weight thereon are entirely supported by the levers I of the opposite weighing frames, and this weight is communicated through the levers K and M of the whole of the frames, through the bell-crank levers S and S', levers Q and Q', and lever R, to the graduated lever.

The main object of my improvements has been to produce an effective scale which can be readily applied to any lock without forming recesses in the walls, and cutting and otherwise wounding the masonry, thereby reducing the labor and cost in erecting the scale. These advantages I attain by the peculiar method of constructing each weighing frame, in which the main lever I is situated at right angles to the walls of the lock, its short arm overhanging the wall, and the connecting rods between this arm and the cradle being on the outside of the wall. As regards simplicity in erection, it will be seen that the weighing frames are secured directly to the masonry, no preparation for receiving them being necessary, excepting the requisite holding down bolts.

On the plates of each weighing frame is a projection $x$, on which the lever I bears, when the lock is full of water, and the cradle is floated, and consequently, when there is no weight on the levers; this projection therefore serves as a guard to prevent the displacement of the levers of the weighing frame when water is introduced into the lock.

I wish it to be understood that I do not desire to claim broadly, a series of bell crank levers arranged along the opposite sides of a lock and connected to a graduated beam. But

I claim as my invention and desire to secure by Letters Patent—

A series of weighing frames, each having the levers I and K and bell crank lever M, connected together and operating as set forth when the said frames are so arranged along the opposite side walls of a lock that the said levers I shall be at right angles to and partly overhang the said walls, as and for the purpose herein described.

In testimony whereof, I have signed by name to this specification, in the presence of two subscribing witnesses.

A. B. DAVIS.

Witnesses:
  HENRY HOWSON,
  JOHN WHITE.